(12) United States Patent
Brochot

(10) Patent No.: US 9,511,793 B2
(45) Date of Patent: Dec. 6, 2016

(54) OFF-CENTRE YOKE FOR A MOTOR VEHICLE STEERING SYSTEM

(71) Applicant: JTEKT EUROPE, Irigny (FR)

(72) Inventor: Patrice Brochot, Oullins (FR)

(73) Assignee: JTEKT EUROPE, Irigny (FR)

( * ) Notice: Subject to any disclaimer, the term of this patent is extended or adjusted under 35 U.S.C. 154(b) by 37 days.

(21) Appl. No.: 14/403,973

(22) PCT Filed: Apr. 11, 2013

(86) PCT No.: PCT/FR2013/050791
§ 371 (c)(1),
(2) Date: Nov. 25, 2014

(87) PCT Pub. No.: WO2013/190192
PCT Pub. Date: Dec. 27, 2013

(65) Prior Publication Data
US 2015/0197274 A1    Jul. 16, 2015

(30) Foreign Application Priority Data

Jun. 18, 2012  (FR) ..................... 12 55676

(51) Int. Cl.
*F16H 55/28* (2006.01)
*B62D 3/12* (2006.01)

(52) U.S. Cl.
CPC ............. *B62D 3/123* (2013.01); *F16H 55/286* (2013.01); *Y10T 74/19623* (2015.01)

(58) Field of Classification Search
CPC ... B62D 3/123; F16H 55/286; Y10T 74/19623
See application file for complete search history.

(56) References Cited

U.S. PATENT DOCUMENTS 3,585,875 A * 6/1971 Adams ................... B62D 3/123
                                                            74/29
6,019,012 A * 2/2000 Cartwright ............... B62D 3/10
                                                            74/402

FOREIGN PATENT DOCUMENTS

| FR | 2951797 A1 | 4/2011 | |
| JP | 2003040116 A | 2/2003 | |
| JP | 2003170841 A | 6/2003 | |
| JP | WO 2007052829 A1 * | 5/2007 | ............. B62D 3/123 |
| WO | 2011048328 A1 | 4/2011 | |

OTHER PUBLICATIONS

International Search Report issued Jul. 24, 2013 re: PCT/FR2013/050791; WO 2011/048328 A1, JP 2003 040116 A and JP 2003 170841 A.

* cited by examiner

*Primary Examiner* — David M Fenstermacher
(74) *Attorney, Agent, or Firm* — Oliff PLC

(57) ABSTRACT

The invention relates to a yoke device which includes a rotary pad (10), the inner periphery (11) of which is off-center relative to the outer periphery (12), clamped against the rear of the rack, and thus pushed toward the teeth of the steering pinion. The rotary pad (10) engages, via the outer periphery thereof (12), with an arcuate cradle (14) of a mounting (13) mounted in the steering gearbox, said pad being biased and rotatably positioned by a clearance-compensation mechanism having a spring means. The outer periphery (12) of the pad and the cradle (14) engage with one another following two contact lines (20, 21) which are spaced apart, parallel to the axis of rotation of the pad.

4 Claims, 2 Drawing Sheets

OFF-CENTRE YOKE FOR A MOTOR VEHICLE STEERING SYSTEM

TECHNICAL FIELD

The present invention concerns, generally, the rack-and-pinion steering systems of motor vehicles. More particularly, this invention focuses on the device called "push member" device of such a steering system, the function of which is to hold the rack in meshing contact with a steering pinion, in turn connected to a steering column, while compensating the defects of the toothings and the wear thereof. Still more particularly, the invention relates to a push member device of the type called "eccentric" push member device, which is a device with a rotating pad provided with means for automatic compensation of the clearance between the steering pinion and the rack.

BACKGROUND

In a rack-and-pinion steering system, the steering pinion is rotatably connected to the steering column, operable by the steering wheel of the vehicle, and this pinion engages the rack slidably mounted in an elongate steering casing. The two ends of the rack, external to the casing, are coupled to steering tie rods associated respectively with the right and left steered wheels of the vehicle. Thus, the rotation of the steering wheel in either direction is transmitted by the steering column to the steering pinion, and is converted into a corresponding translation of the rack which, via the steering tie rods, causes by itself the coordinated orientation of the two steered wheels of the vehicle, for a « steering » to the right or to the left.

In such a steering system, the push member device resiliently acts on the back of the rack, in the region of the steering pinion, for strongly pressing the toothing of this rack against said pinion, thus avoiding any risk of loss of contact of the toothings. The push member device is usually in the form of a « push member line », with a movable part forming a friction pad, guided in translation and biased by resilient means toward the back of the rack.

There are also known the « eccentric » push member devices, which replace the conventional « linear » push member concept with a rotating concept. In such a device, there is provided an annular or arcuate rotating pad which has a circular outer periphery and an inner periphery which is also circular but eccentric relative to its outer periphery. The rotating pad is rotatably mounted in the steering casing, about an axis of rotation parallel to the longitudinal axis of the rack. The eccentric inner periphery of this pad bears against the back of the rack. The rotating pad is rotatably biased or is angularly positioned so that its inner periphery, applied against the back of the rack, pushes back the latter toward the teeth of the pinion so as to maintain engagement of the toothings.

In particular, the French patent FR 2 951 797 or its international equivalent WO 2011048328, in the name of the Applicant, describes an eccentric push member device, as recalled above, in which a clearance compensation mechanism comprises a push member bearing on a radial arm of the rotating pad under the effect of a compression spring inserted between the pusher and a fixed support of the pad, or an element integral with said support. A movable stop, rotatably mounted relative to the support or to said element, includes toothings with stepped teeth which cooperate with notches of the pusher. The movable stop is connected via a torsion spring to the support or to the element integral with the support. Thus, the notches successively cooperate with the stepped teeth of the toothings of the movable stop, so as to « take up » the mechanical clearance due in particular to wear.

In the embodiment described in the aforementioned documents, the rotating pad is rotatably mounted and guided on a support mounted in turn in the steering casing. This support includes an arcuate cradle, on which the outer periphery of the rotating pad bears in a sliding manner.

Trivially, the arcuate cradle of the support, on the one hand, and the outer periphery of the rotating pad, on the other hand, are both cylindrical, one is concave and the other is convex. The drawback of such an embodiment is that in addition to the relative sliding movement between the outer periphery of the pad and the cradle, there also occurs a relative rolling movement due to the manufacturing clearances. This may lead to the occurrence of noise and to a disturbance of the kinematics of the clearance compensation mechanism, in particular when the load applied on the pad changes direction and amplitude.

BRIEF SUMMARY

The present invention aims to eliminate this drawback, and hence aims to define specific and perfected shapes of the arcuate cradle and/or the outer periphery of the rotating pad, being suitable to avoid the rolling movement between these two portions of the mechanism, so as to suppress noise and improve the kinematics of the mechanism.

To this end, the invention provides an eccentric push member device for a rack-and-pinion steering system of a motor vehicle, the push member device comprising an arcuate rotating pad which has an outer periphery and an inner periphery which is eccentric relative to the outer periphery, the rotating pad being rotatably mounted in a steering casing about an axis of rotation parallel to the longitudinal axis of the rack, the outer periphery of this pad bearing on an arcuate cradle belonging to a support mounted in the steering casing, whereas its eccentric inner periphery is applied against the back of the rack, so as to push back the latter toward the teeth of a steering pinion, said pad being rotatably positioned and/or biased by a clearance compensation mechanism with spring means, the eccentric push member device being essentially characterized by the fact that the outer periphery of the rotating pad on the one hand, and the arcuate cradle on the other hand, bear on each other along two spaced contact lines, parallel to the axis of rotation of the pad.

Thus, the invention proposes to define the arcuate shapes of the outer periphery of the rotating pad and/or the cradle belonging to the support of this pad, so that the contact between the two portions takes place along two parallel lines, spaced enough from each other. The two contact lines are judiciously positioned, so that the direction of the forces exerting between the rotating pad and its support is located between these two contact lines. Thus, no relative rolling movement occurs between the pad and the support, in particular when the load applied on the pad changes direction and amplitude.

According to an embodiment of the invention, the outer periphery of the rotating pad has a cylindrical shape, with a constant radius, whereas the arcuate cradle, on which said outer periphery bears along two spaced contact lines, has a profile resulting from the succession of several areas with different radii, tangent to each other at their junction points, this profile being symmetrical relative to an axis which substantially coincides with the mean axis of transfer of the forces between the pad and its support. In this way, the contact takes place along two contact lines symmetrical relative to the axis of symmetry of the profile, which also represents the mean axis of transfer of the forces, the sector swept by these forces being comprised between the two contact lines.

BRIEF DESCRIPTION OF THE DRAWINGS

Anyway, the invention will be better understood using the following description, with reference to the appended schematic drawing representing, by way of example, an embodiment of this eccentric push member device for a motor vehicle steering system.

DETAILED DESCRIPTON

Figure 1:
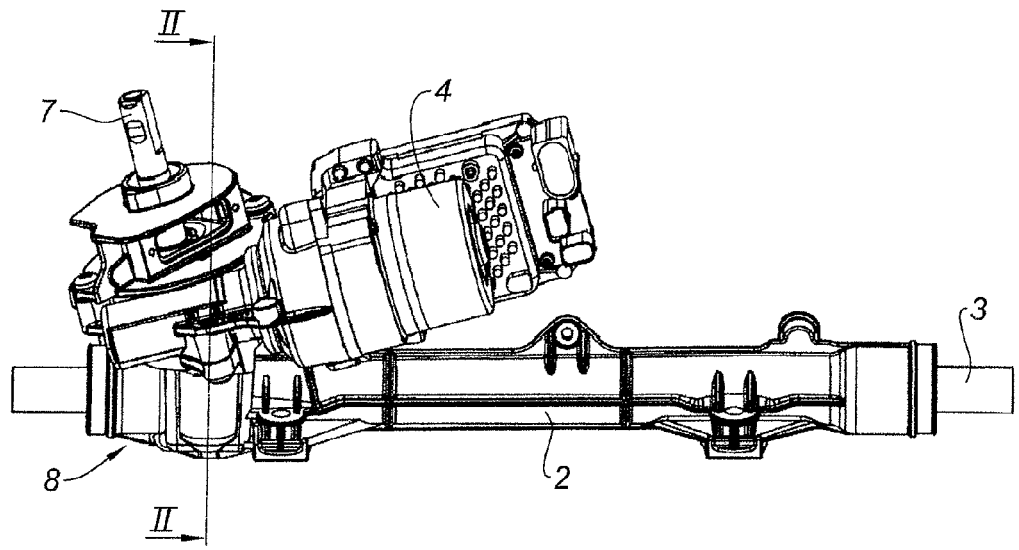
FIG. 1 is an outer view of an electric power-assisted steering equipped with the eccentric push member device in an exemplary embodiment of the present invention.

FIG. 1 shows an electric power-assisted steering of a motor vehicle, with (in the case of this example) an assistance acting at the steering pinion. This steering comprises a steering casing 2, which extends along a longitudinal axis. In the steering casing 2, there is slidably mounted a rack 3, the ends of which, that are external to the casing 2, are coupled to steering tie rods (not represented here). An assistance electric motor 4 is coupled, via a gear reducer, to a steering pinion 5 which is engaged with the toothing 6 of the rack 3 (see also FIG. 2). The steering pinion 5 is connected to an inlet shaft 6, to which the steering column (not represented) is coupled, the latter being operable by means of the steering wheel of the vehicle.

Figure 2:
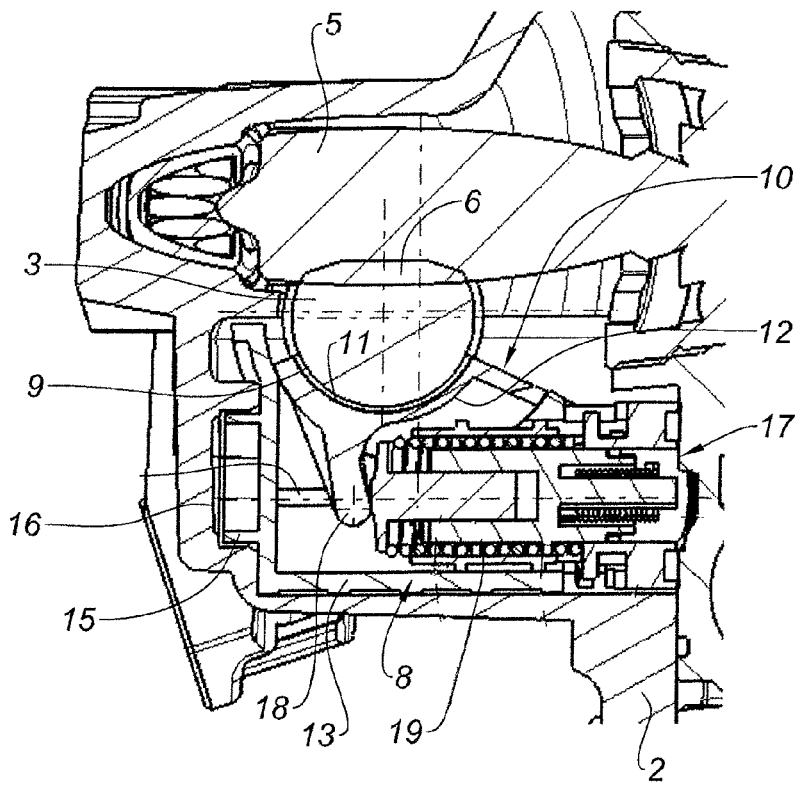
FIG. 2 is a sectional view along the line II-II of FIG. 1, passing through the eccentric push member device.

A push member device, designated as a whole by the numerical reference 8, is provided in the proximity of the steering pinion 5, for pressing the toothing 6 of the rack 3 against the steering pinion 5, the push member device 8 being represented in detail in FIG. 2 and following.

The push member device 8 is placed on the back 9 side of the rack 3, in other words opposite to the toothing 6 of this rack 3 and also opposite to the steering pinion 5, this push member device 8 being housed in a corresponding portion of the steering casing 2.

The push member device 8, of the type called « eccentric » push member device, comprises a rotating pad 10, which is a part with a rounded profile and, more particularly, an arcuate part which has a wedge shape. The rotating pad 10 exhibits an inner periphery 11 with an arc of circle profile which is eccentric relative to its outer periphery 12, also with an arc of circle profile. The eccentric inner periphery 11 of the rotating pad 10 forms a bearing surface applied against the back 9 of the rack 3, so as to push back the toothing 6 of this rack 3 against the teeth of the steering pinion 5.

Figure 3:
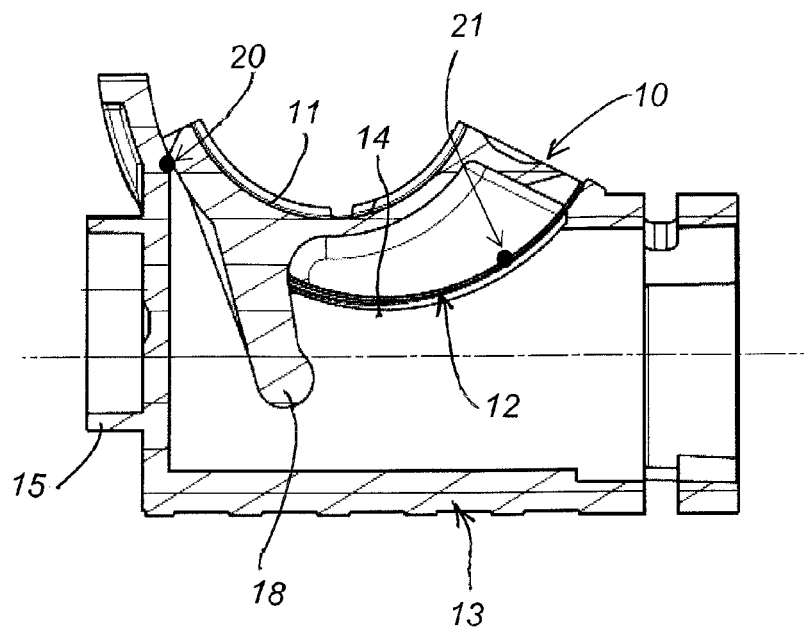
FIG. 3 represents, in more detail, the subassembly formed by the rotating pad and by its support, sectionally viewed, with their two contact lines.
Figure 4:
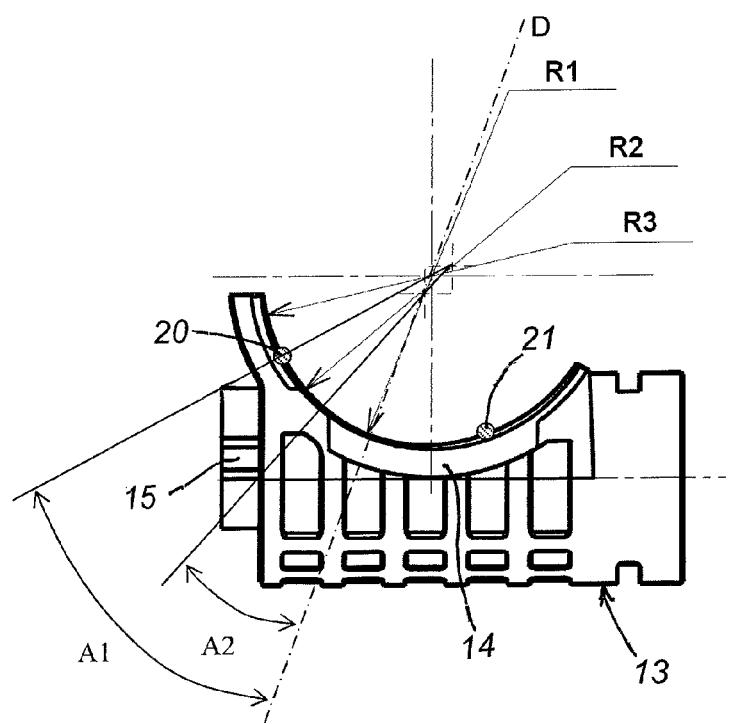
FIG. 4 illustrates a particular example of a profile of the cradle.

The rotating pad 10 is mounted and guided on a support part 13, in turn mounted in the region of interest of the steering casing 2, the configuration of the support part 13 being clearly visible in FIGS. 3 and 4. This support part 13 includes an arcuate cradle 14, on which the outer periphery 12 of the rotating pad 10 bears in a sliding manner. At one end, the support part 13 exhibits an oblong protrusion 15, engaged in a corresponding recess 16 of the steering casing 2 (see also FIG. 2).

The rotating pad 10 is rotated relative to the support part 13 by applying a push, exerted by a clearance compensation mechanism 17 on a radial arm 18 that the rotating pad 10 includes. The clearance compensation mechanism 17, visible in FIG. 2, comprises in particular a compression spring 19. For more detail on the structure and the operation of this clearance compensation mechanism 17, reference will be made to the French patent FR 2 951 797 in the name of the Applicant.

As shown in FIG. 3, the outer periphery 12 of the rotating pad 10, with a strictly circular profile, that is to say with a constant radius R, bears on the cradle 14 of the support part 13 along only two contact lines 20 and 21, parallel therebetween and spaced from each other, the two contact lines 20 and 21 being also parallel to the longitudinal axis of the casing as well as to the axis of rotation of the rotating pad 10.

Obtaining these two contact lines 20 and 21 results from a particular definition of the concave arcuate shape of the cradle 14 of the support part 13, an example of a profile of this cradle 14 being illustrated in FIG. 4.

The profile of the arcuate cradle 14 is here symmetrical relative to an axis D, with a radial general direction, this axis of symmetry corresponding to the mean axis of transfer of the forces between the rotating pad 10 and its support part 13. On either side of the axis D, the profile of the cradle 14 results from the succession of three areas with different radii R1, R2 and R3, these areas being tangent to each other at their junction points.

The values of the various radii are chosen so as to satisfy the relationship:

$$R2 > R3 > R > R1$$

The angle A1 (measured from the axis D) which defines the passage from the radius R2 to the radius R3 is chosen larger than half of the angular sector swept by the forces between the rotating pad 10 and its support part 13. The angle A2 (measured from the axis D) which defines the passage from the radius R1 to the radius R2 is arbitrarily fixed to half of the angle A1, precedingly defined. The values of the radii R1 and R2 are adjusted to obtain an enough significant clearance between the rotating pad 10 and the support part 13, so as to guarantee a contact on two lines 20 and 21 whatever the manufacturing tolerances are. Thus the contact between the outer periphery 12 of the rotating pad 10 and the cradle 14, along the two lines 20 and 21, takes place at the junction points of the areas with radii R1 and R2, on either side of the axis D, so that the sector swept by the forces is comprised between these points. The area with the radius R3, which is the farthest away from the axis D, creates a gap between the rotating pad 10 and its support part 13, avoiding any other contact beyond the two contact lines 20 and 21.

As is evident, the invention is not limited to the sole embodiment of this eccentric push member device which has been described above, as an example; it encompasses, on the contrary, all the alternative embodiments and applications coming under the same principle. Thus is how, in particular, there would be no departure from the scope of the invention:

by modifying the detailed shapes of the rotating pad and its support part, provided that the two contact lines between these parts are present;

by intending the same eccentric push member device to steering systems of all types: manual steering, electric power-assisted steering, hydraulic power-assisted steering, with assistance that may act at various points of the steering system.

The invention claimed is:

1. An eccentric push member device for a rack-and-pinion steering system of a motor vehicle, the push member device comprising an arcuate rotating pad which has an outer periphery and an inner periphery which is eccentric relative to the outer periphery, the rotating pad being rotatably mounted in a steering casing about an axis of rotation parallel to the longitudinal axis of the rack, the outer periphery of this pad bearing on an arcuate cradle belonging to a support mounted in the steering casing, whereas its eccentric inner periphery is applied against the back of the rack, so as to push back the latter toward the teeth of a steering pinion, said pad being rotatably positioned and/or biased by a clearance compensation mechanism with spring means, wherein the outer periphery of the rotating pad, on the one hand, and the arcuate cradle on the other hand, bear on each other along two spaced contact lines, parallel to the axis of rotation of the pad.

2. The eccentric push member device according to claim 1, wherein the outer periphery of the rotating pad has a cylindrical shape, with a constant radius referred to as "pad outer radius R", whereas the arcuate cradle, on which said outer periphery bears along the two spaced contact lines, has a profile resulting from the succession of several areas with different radii, tangent to each other at their junction points, namely at least a first area with a first radius R1 and a second area with a second radius R2, this profile being symmetrical relative to an axis, referred to as "D-axis", which substantially coincides with the mean axis of transfer of the forces between the rotating pad and its support.

3. The eccentric push member device according to claim 2, wherein, on either side of the D-axis, the profile of the cradle results from the succession of three areas with different radii, namely the first area with the first radius R1, the second area with the second radius R2, and a third area with a third radius R3, satisfying the relationship:

$$R2>R3>R>R1.$$

4. The eccentric push member device according to claim 2, wherein the contact between the outer periphery of the rotating pad and the cradle, along the two spaced contact lines, takes place at the junction points of the first area with the first radius R1 and the second area with the second radius R2, on either side of the D-axis.

* * * * *